US007182248B2

(12) United States Patent
Ookushi

(10) Patent No.: US 7,182,248 B2
(45) Date of Patent: Feb. 27, 2007

(54) MEAL INFORMATION SUPPLY SYSTEM AND MEAL INFORMATION SUPPLY SERVICE METHOD THEREOF

(75) Inventor: Yasunori Ookushi, Tokyo (JP)

(73) Assignee: NEC Infrontia Corporation, Kanagawa (JP)

( * ) Notice: Subject to any disclaimer, the term of this patent is extended or adjusted under 35 U.S.C. 154(b) by 931 days.

(21) Appl. No.: 10/013,485

(22) Filed: Dec. 13, 2001

(65) Prior Publication Data

US 2002/0099771 A1 Jul. 25, 2002

(30) Foreign Application Priority Data

Dec. 19, 2000 (JP) .............................. 2000-384576

(51) Int. Cl.
*G06F 17/00* (2006.01)
(52) U.S. Cl. ........................ 235/375; 128/921; 434/127
(58) Field of Classification Search ................ 235/375; 705/2–3; 128/921; 434/127
See application file for complete search history.

(56) References Cited

U.S. PATENT DOCUMENTS 5,412,564 A * 5/1995 Ecer ........................... 600/300
5,819,735 A * 10/1998 Mansfield et al. .......... 600/300

FOREIGN PATENT DOCUMENTS

| JP | H05-324998 | 12/1993 |
|----|------------|---------|
| JP | 07093287 A * | 4/1995 |
| JP | H09-231472 | 9/1997 |
| JP | 2000-322404 | 11/2000 |
| JP | 2000-331080 | 11/2000 |
| JP | 2000331080 A * | 11/2000 |

OTHER PUBLICATIONS

Masakazu, Ishibashi. "Nutritive Balance Information Providing System" JP Application 08-058311, Pub. No. 09-231472 Machine Translation from JPO website as of Jun. 14, 2006.*
*Health Management on the Net*, Gekkan Computer Digest, dated Apr. 10, 2000, vol. 26, No. 4, p. 104.
*Learning to Use a PC from the Ground Up Lesson 5—Electronic Mail*, Nikkei BP Mukku, dated Aug. 1, 1998, pp. 144-147.
*Explorations of Japanese Style Internet Business*, dated Oct. 15, 2001, 1st Edition, pp. 143-149.

* cited by examiner

*Primary Examiner*—Michael G. Lee
*Assistant Examiner*—Daniel A. Hess
(74) *Attorney, Agent, or Firm*—Sughrue Mion, PLLC

(57) ABSTRACT

The meal information supply system includes a small-sized portable terminal for reading a bar code of meal data indicative of the contents of an individual meal taken by a user to obtain the meal data and a meal information supply server for receiving, from the portable terminal of a user, a notification of meal data of the user in question through a communication network, analyzing the contents of the meal indicated by the meal data, totalizing, managing and analyzing information about intake including information of a calorie and a food group of a meal taken by each user with respect to each user, generating data of advice on management of eating habits of the user in question and notifying meal information of analysis results to the user through a communication network.

19 Claims, 9 Drawing Sheets

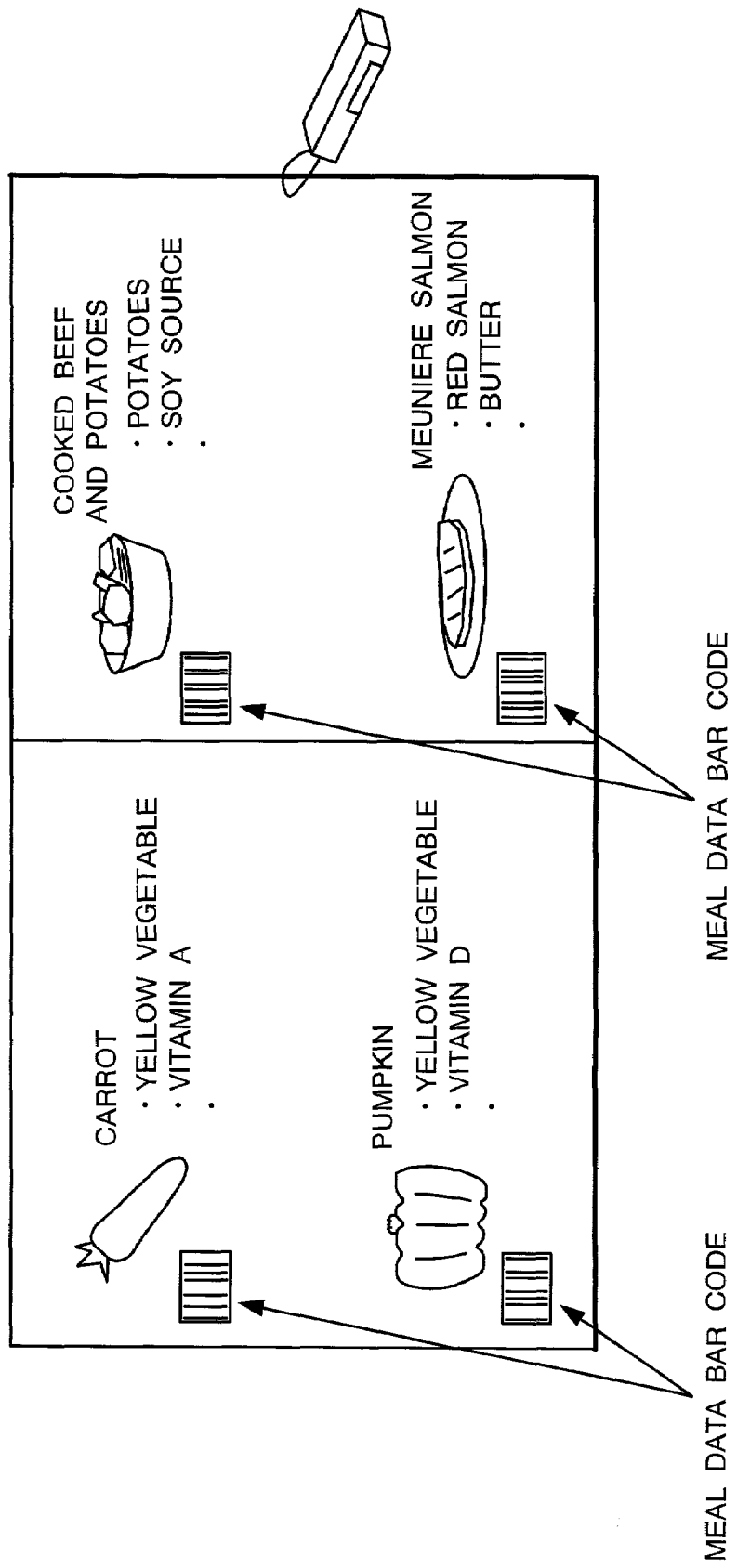

MEAL INFORMATION SUPPLY SYSTEM AND MEAL INFORMATION SUPPLY SERVICE METHOD THEREOF

BACKGROUND OF THE INVENTION

1. Field of the Invention

The present invention relates to a health care system using a communication line such as the Internet and, more particularly, to a meal information supply system for supplying advice on management of eating habits based on analyses of the contents of a meal taken by each user and a meal information supply service method thereof.

2. Description of the Related Art

There have been many people who are interested in daily meals for their health care and they make it a rule to minutely check and control calories of meals and kinds and the like of foods and nutritive elements they take.

Those people conventionally have the following difficulties in their health care.

For conventional management of information such as a total intake of calories and intake food groups, each individual requires laborious work of minutely checking a calorie intake from an individual meal. In order to analyze these information about a calorie of each meal and the like, therefore, special knowledge for minutely analyzing the contents of foods taken is required, which is also required for determining eating habits optimum for oneself based on information such as a total intake of calories and intake food groups, making such work difficult. Moreover, when eating out, although more and more stores have indication of calories these days, there still remain many stores which fail to indicate information such as a calorie of a meal and food materials, so that total management of eating habits is very difficult.

Thus, management of eating habits has been conventionally difficult and laborious and there are many people who have unbalanced eating habits to contribute to an increase in the number of people who are of overweight or malnutrition and the number of health troubles such as cerebral infraction due to supernutrition. Under these circumstances, management of eating habits of each individual is an urgent need.

SUMMARY OF THE INVENTION

An object of the present invention is to solve the above-described conventional problems and provide a meal information supply system capable of managing information such as a calorie of a meal each individual takes and its food group with ease and in detail and a meal information supply service method thereof.

According to the first aspect of the invention, a meal information supply system, comprises a user terminal which obtains meal data indicative of the contents of an individual meal taken by a user, and a meal information supply server which receives a notification of the meal data from the user terminal and analyzes the contents of a meal indicated by the meal data to notify the user of meal information of analysis results.

In the preferred construction, the meal information supply server totalizes, manages and analyzes information about intake including information of a calorie and a food group of a meal taken by each the user based on the meal data notified with respect to each the user and notifies meal information of analysis results to the user.

In another preferred construction, the meal information supply server totalizes, manages and analyzes information about intake including information of a calorie and a food group of a meal taken by each the user based on the meal data notified with respect to each the user and notifies meal information of analysis results to the user, and based on the intake information of each the user, generates data of advice on management of eating habits of the user in question to notify the user in question of the meal information with the generated data included.

In another preferred construction, the user terminal includes a bar code reader which receives supply of the meal data of a meal taken by the user as bar code indication, wherein read the bar code to obtain the meal data in question.

In another preferred construction, the meal information supply system further comprises a book having a list of bar codes indicative of meal data of individual meal and food material, with reference to which book a user obtains meal data of a meal taken by himself/herself.

In another preferred construction, the meal information supply server receives a notification of the meal data through a communication network and gives a notification of the meal information through the communication network.

In another preferred construction, the user terminal includes a connection interface which transmits the meal data obtained to an external terminal device.

In another preferred construction, the meal information supply server includes account management unit which manages accounts of a service charge of each the user.

According to the second aspect of the invention, a user terminal for meal management, comprises a memory which records meal data indicative of the contents of an individual meal taken by a user, a bar code reader which obtains the meal data indicated by a bar code, and notification unit which outputs the meal data obtained to notify the meal data to a meal information supply server which analyzes the contents of a meal taken by a user in question based on the meal data.

In the preferred construction, the user terminal for meal management further comprises a connection interface for the connection with an external terminal device, to notify the meal information supply server of the meal data obtained through the terminal device.

In another preferred construction, the user terminal for meal management further comprises communication unit which communicates the meal data to the meal information supply server through a communication network.

In another preferred construction, the user terminal is a small-sized portable terminal.

In another preferred construction, the user terminal is a small-sized portable terminal having a strap for the carriage of the terminal hanging on the neck.

According to the third aspect of the invention, a meal information supply service method, comprising the steps of from a user terminal for obtaining meal data indicative of the contents of an individual meal taken by a user, receiving a notification of the meal data, and analyzing the contents of a meal indicated by the meal data to notify the user of meal information of analysis results.

In the preferred construction, the meal information supply service method further comprising a step of totalizing, managing and analyzing information about intake including information of a calorie and a food group of a meal taken by each the user based on the meal data notified with respect to each the user and notifying meal information of analysis results to the user.

In another preferred construction, the meal information supply service method further comprising a step of, based on the intake information of each the user, generating data of advice on management of eating habits of the user in question to notify the user in question of the meal information with the generated data included.

In another preferred construction, the meal information supply service method further comprising a step of, based on the intake information of each the user, generating data of advice on management of eating habits of the user in question to notify the user in question of the meal information with the generated data included, and as service to be provided to each the user, basic service of supplying a totalization result of the meal information determined based on the contents of a meal taken by the user and the advice on management of eating habits and additional service of supplying additional information about esthetics and health, wherein at the supply of the additional service, an extra charge is collected from a user in question In another preferred construction, the meal information supply service method further comprising a step of notifying a party concerned in diner business of specifications of a bar code indicative of the meal data of an individual meal in advance, a step of the party concerned in diner business of indicating the meal data of a meal to be supplied to each the user as a bar code to the user, and a step of the user of obtaining the meal data of a meal supplied by the parity concerned in diner business by the function of a bar code reader provided at the user terminal.

In another preferred construction, the meal information supply service method further comprising a step of providing the user with a book having a list of bar codes indicative of meal data of individual meal and food material, with reference to which book a user obtains meal data of a meal taken by himself/herself.

In another preferred construction, the meal information supply service method further comprising the steps of setting up a web site for the supply of service to the user, and putting an advertisement of the party concerned in diner business on the web site to collect an advertisement fee.

According to another aspect of the invention, a meal information management program readable by a computer, comprising the functions of from a user terminal for obtaining meal data indicative of the contents of an individual meal taken by a user, receiving a notification of the meal data, analyzing the contents of a meal indicated by the meal data, and notifying the user of meal information of analysis results.

According to the present invention, with information such as a calorie of an individual meal to be supplied and a food group of its food material indicated on a menu of a diner by common bar codes, a user reads the bar codes by a dedicated portable terminal (meal management terminal) every time he/she dines and on the spot or later sends meal data indicative of the contents of the meal taken by himself/herself to a web site operated by a calorie calculation agent through the Internet, whereby service can be provided of notifying meal information about a result of analyses of a total amount of calorie taken by each individual and food groups taken by him/her. As a result, each user is allowed to obtain detailed information, concerning his/her own eating habits, such as an intake calorie and what is sufficiently taken and what is not sufficient. It is also possible to charge for the provision of this service and manage the collection of service charges from users and the like.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 11 is a view showing one example of a book with a list of meal data according to the first embodiment of the present invention.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
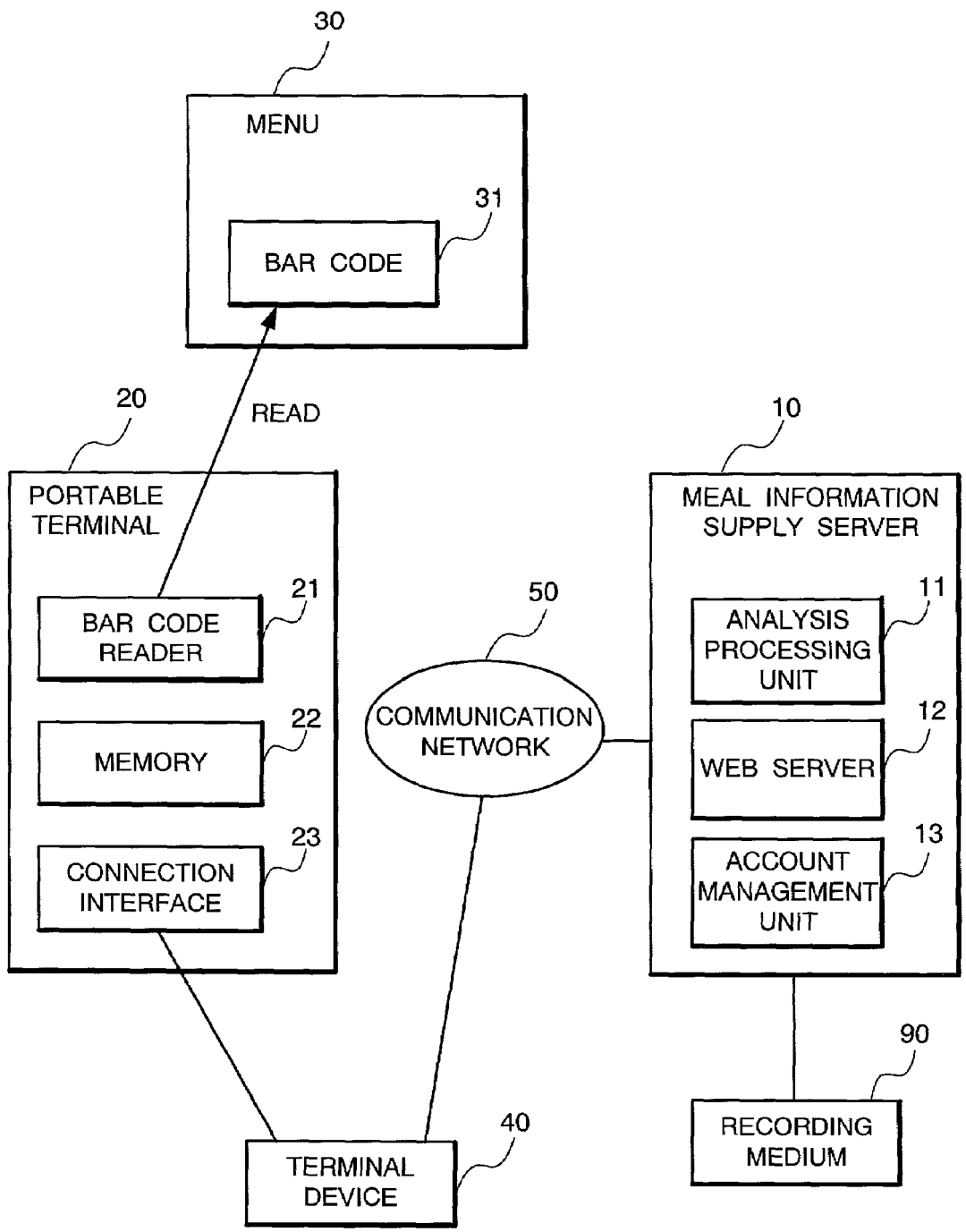
FIG. 1 is a block diagram showing a structure of a meal information supply system according to a first embodiment of the present invention.
Figure 2:
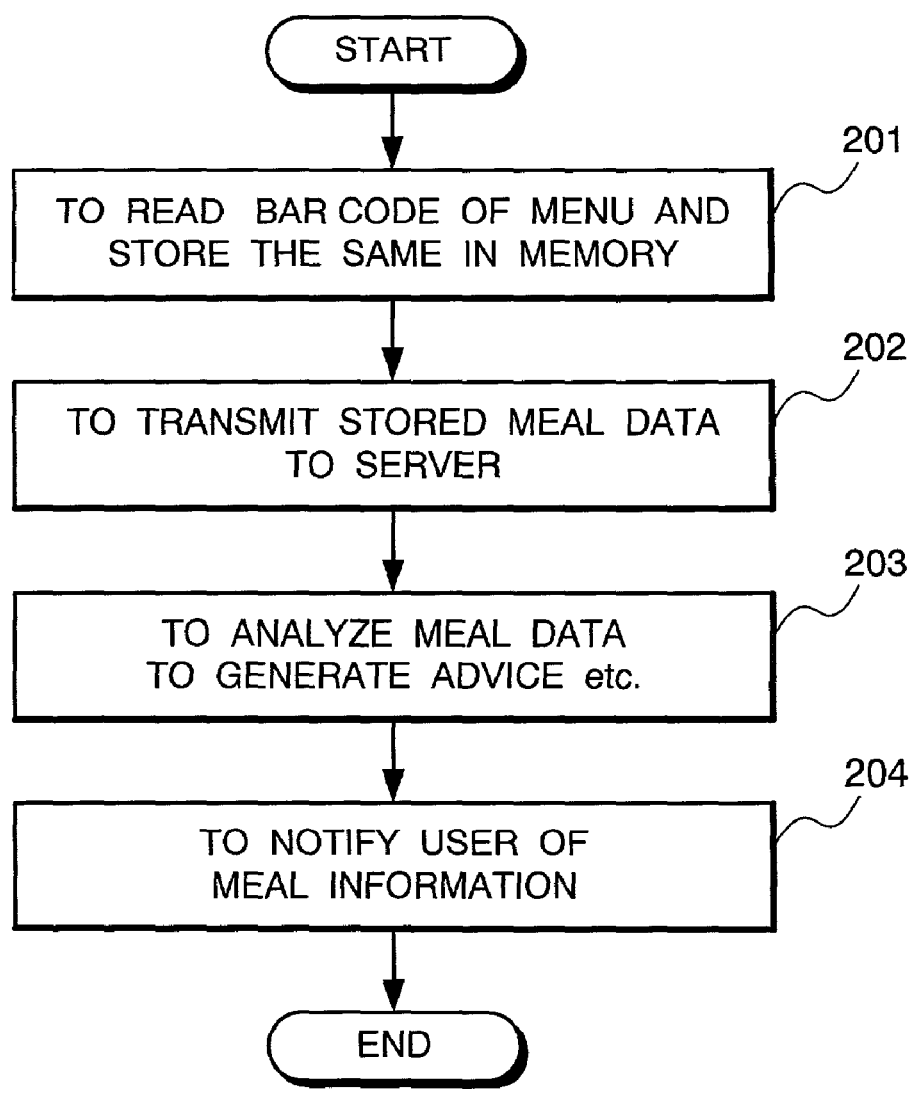
FIG. 2 is a flow chart for use in explaining processing of the meal information supply system according to the first embodiment of the present invention.

FIG. 1 is a block diagram showing a structure of a meal information supply system according to a first embodiment of the present invention, while FIG. 2 is a flow chart for use in explaining processing of the meal information supply system according to the present embodiment.

Figure 3:
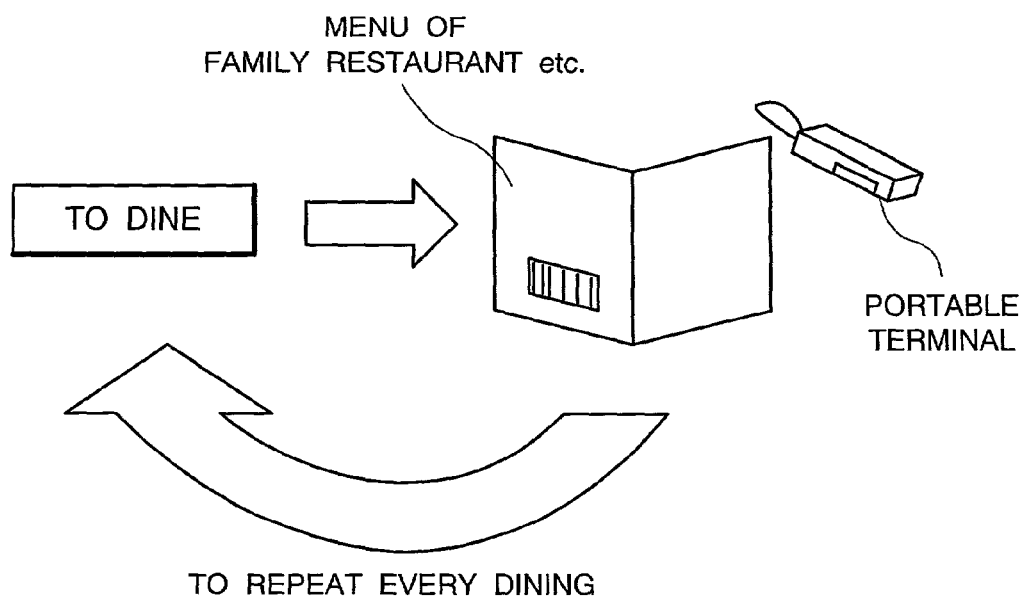
FIG. 3 is a view for use in explaining an outline of the meal information supply system according to the first embodiment of the present invention.

According to the present embodiment, as illustrated in FIG. 3, when dining, a user reads a bar code 31 of meal data from a menu 30 (FIG. 4) by means of a bar code reader 21 of a user's portable terminal 20 (FIG. 5) and records the same in a read memory 22 (Step 201 and Step 202).

Thereafter, the user sends the meal data recorded in the memory 22 to a meal information supply server 10 (FIG. 7) operated by a calorie calculation agent through a communication network 50 such as an internet (Step 203).

The meal information supply server 10 analyzes the meal data to generate a total intake of calories, advice on eating habits and the like (Step 204) and notifies the user of the data as meal information of the analysis result (FIG. 8) (Step 205). The calorie calculation agent may collect service charges for this meal information supply service from the user as illustrated in FIG. 9.

The calorie calculation agent calls on many parties concerned such as diner operators to use bar code specifications for indicating the meal data as bar codes and persuades them to put the bar codes in more menus.

Figure 10:
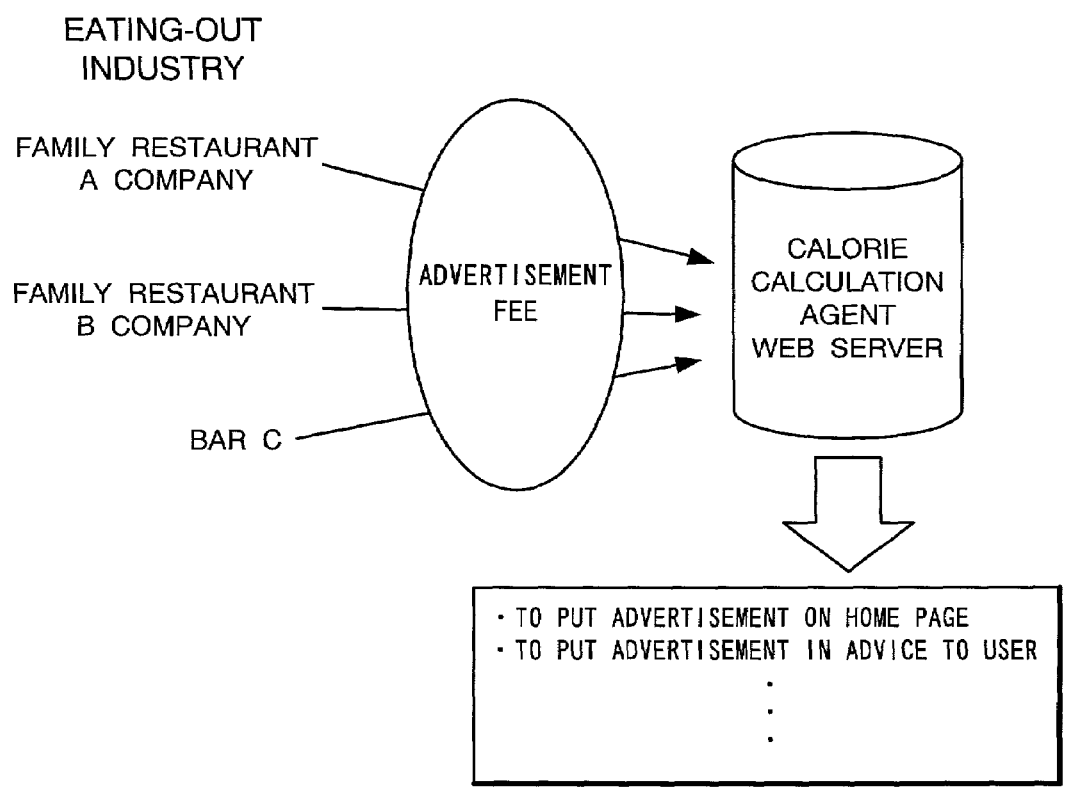
FIG. 10 is a diagram for use in explaining how an advertisement for meal information supply by each party concerned in diner business is put according to the first embodiment of the present invention.

Other than meal data analyses, the calorie calculation agent can conduct business, for example, of inviting parties concerned in diner business to put a fee-charging advertisement on a web page of a meal information supply site (FIG. 10). Also, publishing and selling a book having a list of meal data of individual food material and dish (FIG. 11) enables a user to manage his/her own eating habits at domestic dining. The calorie calculation agent can also do business of selling the portable terminal (FIG. 5) to users.

In the specification of the present invention here, the side which receives supply of information such as an intake calorie is referred to as a user, a party concerned who supplies each user with information is referred to as a calorie calculation agent and a party concerned who indicates a bar code indicative of the contents of a meal according to the present invention in a menu for dishes is referred to as a party concerned in diner business. In addition, data indicative of the contents of a meal taken by a user which will be notified by himself/herself to the meal information supply server 10 is referred to as meal data, while an analysis result of user's meal data which will be notified to the user by the meal information supply server 10 is referred to as meal information.

User is one who receives supply of meal information according to the present embodiment and who needs information about what kind of meal he or she now takes mainly through eating-out and how to deal with the dining in consideration of health and esthetics.

Figure 5:
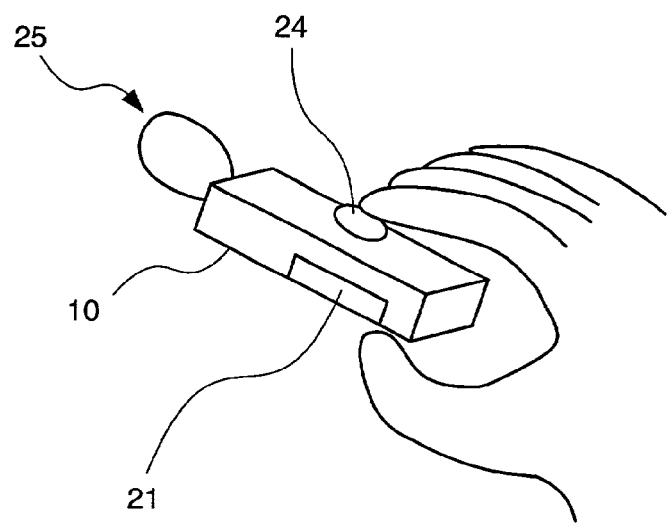
FIG. 5 is a view showing a user's portable terminal according to the first embodiment of the present invention.
Figure 8:
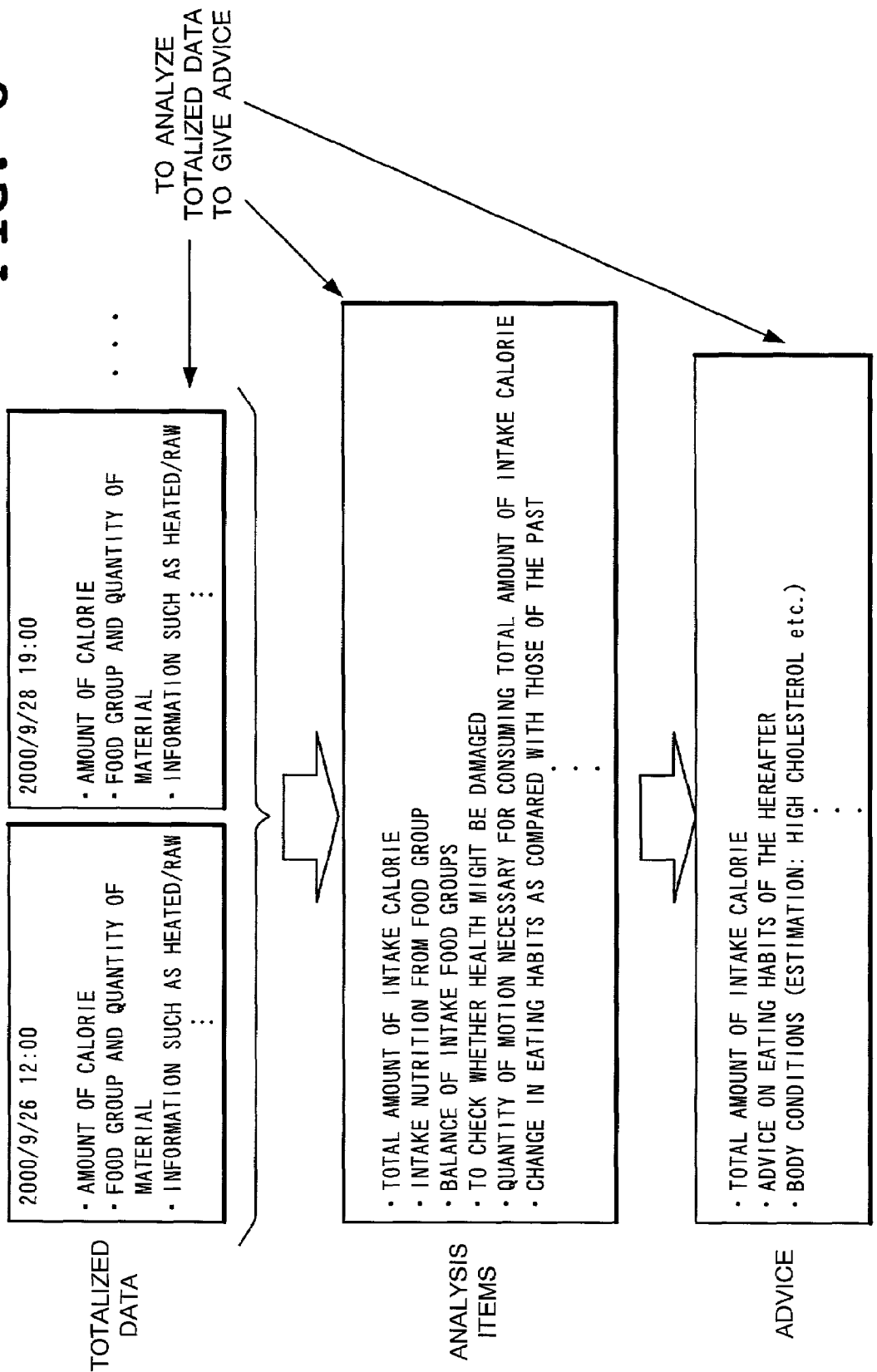
FIG. 8 is a diagram for use in explaining analyses of user's meal data according to the first embodiment of the present invention.
Figure 9:
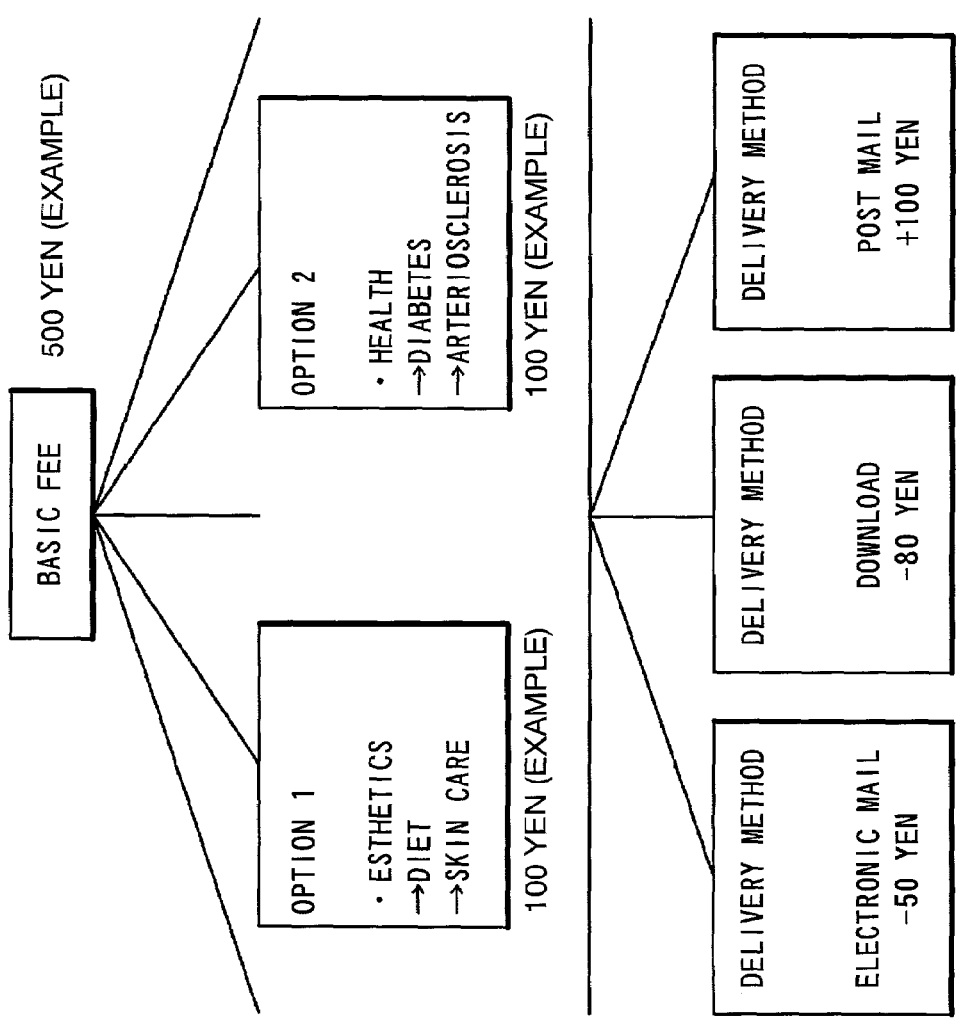
FIG. 9 is a diagram for use in explaining account management of service charges of users according to the first embodiment of the present invention.

By carrying the portable terminal (meal management terminal) 20 of the present embodiment shown in FIG. 5, the user is allowed to receive the meal information supply service of the present embodiment illustrated in FIG. 8. The meal information supply service may be chargeable service to receive payment for the service from a user.

The calorie calculation agent is one who provides meal information according to the present invention, and defining specifications of bar codes of the meal data (FIG. 4), it invites many parties concerned in diner business to use the system and also totalizes, manages and analyzes meal data of each individual obtained from users to provide service of notifying the user of its analysis result and advice based on the analysis result. Provision of the service to the user may be charged as illustrated in FIG. 9.

The calorie calculation agent has a web server 12 in the meal information supply server 10 or the like to set up and operate a web site for providing meal information (meal information supply site) and the agent can accept an advertisement to be put on the meal information supply site from a party concerned in diner business and receive a payment therefor as illustrated in FIG. 10.

The calorie calculation agent is also allowed to manufacture and sell the portable terminal (FIG. 5) and create and publish the book (FIG. 11) having a list of meal data of each individual meal and food material.

Parties concerned in diner business are those who conduct business in the general form of providing meals such as a family restaurant and a diner, which supply users with each dish with a bar code of meal data indicated on a menu. The calorie calculation agent also asks a party who fails to have a menu with bar codes to indicate bar codes according to the present invention.

Party concerned in diner business also puts its advertisement on the meal information supply site operated by the calorie calculation agent and in this case pays an advertisement fee to the calorie calculation agent.

Next, structure of each component of the present embodiment will be described in detail with reference to the drawings.

Figure 4:
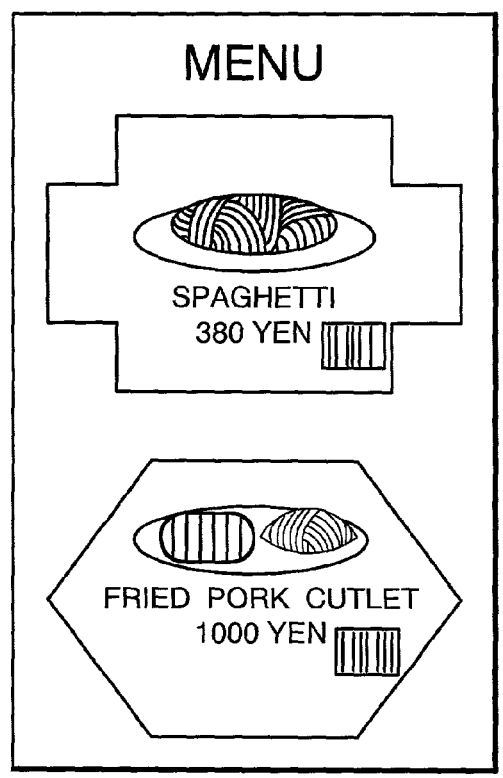
FIG. 4 is a view showing one example of a menu on which bar codes of the first embodiment of the present invention are indicated.

The bar code indicative of meal data of each meal according to the present embodiment which is shown in FIG. 4 and the like represents information such as a calorie of a target menu and a food group of a food material used. Because of the volume of information, the bar code may be a two-dimensional bar code or the like.

The meal data indicated by the bar code is information necessary for calculating what kind of nutriment and how much of it is taken as a result of intake of the menu. Provision of the data may be realized, for example, by making the data into a bar code by the side of each party concerned in diner business based on a format defined by the calorie calculation agent and indicating the bar code on a menu.

As a method of putting a bar code on a menu, indicating a bar code beside each product on the menu or other method is possible.

The portable terminal (meal management terminal) 20 of the present embodiment, as illustrated in the example of FIG. 1, includes the bar code reader 21 and the memory 22 for recording a bar code of a menu at the time of dining and includes a connection interface 23 for the connection with a personal computer and a cellular phone to transmit meal data to the meal information supply server 10 through the communication network 50

Figure 6:
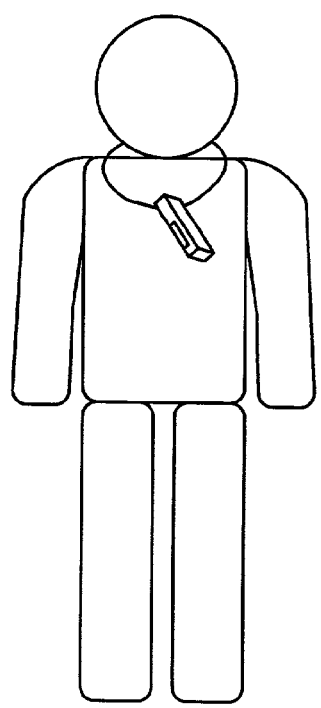
FIG. 6 is a view showing a state where a user carries the portable terminal of the first embodiment of the present invention.

As illustrated in the example of FIG. 5, the terminal also includes a read button 24 as a push button for instructing read of a bar code, and pressing the read button 24 starts the bar code reader 21 to read a bar code. Providing the main body of the terminal with a strap 25 as illustrated, for example, in FIG. 6, enables a user to carry the terminal hanging on the neck.

Taking always carrying the portable terminal 20 into consideration, the terminal is formed to have as small a size as enabling hanging on the neck. In addition, the bar code reader 21 is designed to have a lateral reading portion to save a space. As a power source, a charging battery or an AA size dry battery is used and as a memory, a non-volatile flash memory or the like is used to make an LED of the bar code reader emit only when the read button 24 is pressed, thereby suppressing power consumption as much as possible.

The portable terminal 20 of the present embodiment can be thus mass-produced at a low cost and can be sold at an inexpensive price, so that it can be expected to be used widely by numerous consumers.

As other embodiments of the portable terminal 20 of the present embodiment, the function of the portable terminal 20 according to the present embodiment may be incorporated into a cellular phone or the function may be incorporated into an MP3 player.

Analyses of meal data of each user according to the present embodiment are conducted by an analysis processing unit 11 of the meal information supply server 10 which, as illustrated in the example of FIG. 8, totalizes and manages meal data of each user on an individual user basis to indicate meals, nutritive elements and food groups taken for a fixed time period, as well as giving advice on eating habits optimum for each individual taking the individual's age, sex, physical features (height, weight), daily customs (having much exercise or not etc.), having disease or not and wishes (diet, building-up of muscle, etc.) into consideration.

Notification of the advice may be made by an electronic mail, paper through post mail, information downloading from a web site or the like and some of these methods may be selected by a user.

Management of service charges of the meal information supply system according to the present embodiment is conducted by an account management unit 13 of the meal information supply server 10 to collect service charges from users and the like.

The account system of the present embodiment in the example of FIG. 9 is made up of a monthly basic fee for calorie calculation agent service and an additional fee necessary when using advice on eating habits as an option.

With a basic fee for service only, it is assumed that a list of intake contents for a fixed time period and advice on eating habits of the hereafter are notified and as to an option, provided for example are an option 1 which is an esthetic course (advice on eating habits necessary for diet, skin care, etc.) and an option 2 which is a health course (advice on eating habits necessary for building up physical strength, recovery of health, etc.), thereby giving optional advice on an additional fee basis.

Also according to an information notification form, an account system is provided. With a notification method, for example, by an electronic mail and downloading from a web site through the communication network, a charge system may be provided to be less expensive than by the post mail notification method using paper.

In addition, as illustrated in the example of FIG. 10, the service of putting a fee-charging advertisement on the meal information supply site for parties concerned in diner business can be executed by putting a banner advertisement on a web page which introduces the service in question or other method. Other possible method is, for example, putting an advertisement as an advertisement article in meal information to be delivered to users. For each of these methods, a charge system is set to charge for the service.

In the book having a list of meal data as illustrated in the example of FIG. 11, indicating representative menus cooked at each home all in bar codes enables the use of the meal information supply service of the present embodiment using the meal data also at daily domestic meal. Further indication of bar code menus regarding food groups enables meal data of a meal which is not recited in the book to be obtained by using a food group of a food material and its intake.

The book can be sold for pay or delivered to users free of charge.

Next, detailed description will be made of processing of one embodiment of supply of meal information according to the present embodiment.

A user makes a contract with a calorie calculation agent for receiving meal information supply service in advance based on such a charge system as illustrated in the example of FIG. 9.

The calorie calculation agent beforehand promotes parties concerned in diner business for the indication of bar codes according to the present embodiment on menus to prepare environments where the present service is easy to use. On the other hand, the agent is capable of accepting sounding on entry of the bar codes from the side of the parties concerned in diner business so as to use the present service and providing specifications of the bar codes of meal data, a generation method of the bar codes, a bar code generation device, etc.

At dining, a user reads the bar code (FIG. 4) indicated on a menu of a diner from the portable terminal 20 (FIG. 5) as illustrated in FIG. 3.

Figure 7:
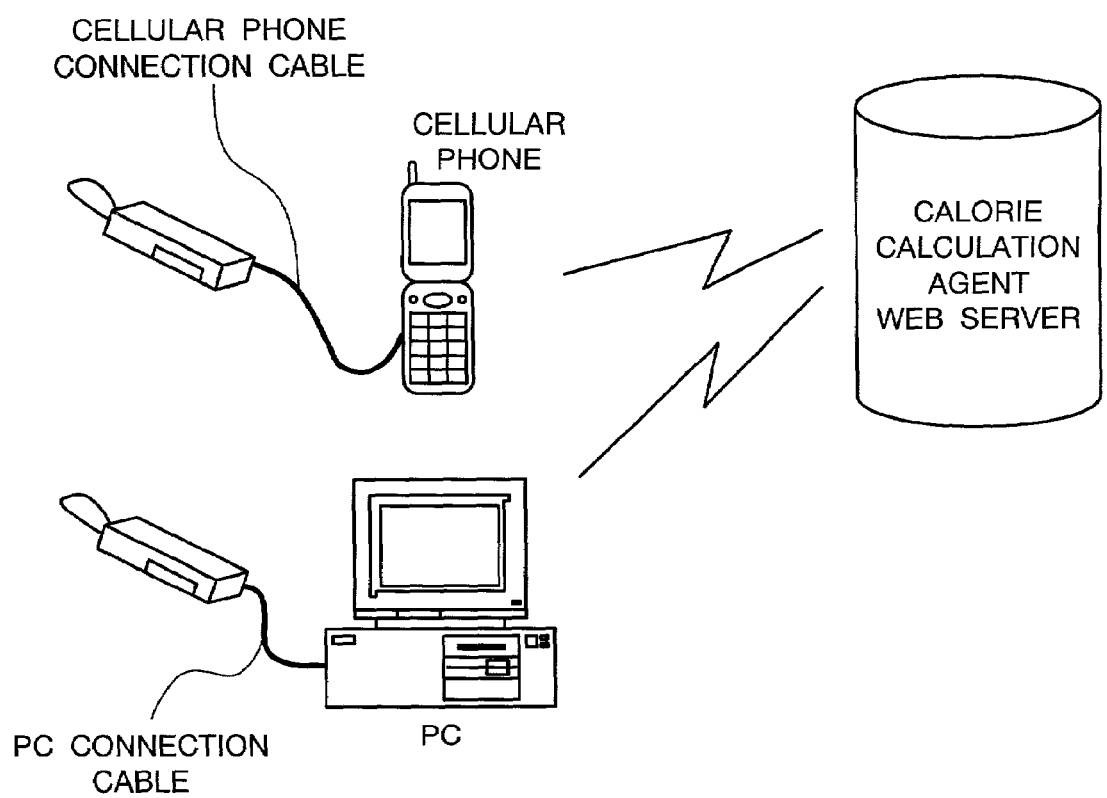
FIG. 7 is a view for use in explaining uploading of meal data to a meal information supply server according to the first embodiment of the present invention.

The memory 22 of the portable terminal 20 is designed to record meal data of approximately one month, for example, and connect to a terminal device 40 such as a personal computer or a cellular phone at an unspecified cycle (or fixed cycle) as illustrated in FIG. 7 to upload meal data to the meal information supply server 10 through the terminal device 40.

Upon receiving the user's meal data, the meal information supply server 10 totalizes and manages meal data of each user and conducts its analysis as illustrated in the example of FIG. 8. On this occasion, when a contract for such options as illustrated in the example of FIG. 9 is made with the user, the server notifies the user of meal information about the totalization result and the analysis result having the contents (esthetics and health) conformed to the optional contract. As a meal information notification method, a method by an e-mail, downloading from a web page, post mail using paper or other as illustrated in the example of FIG. 9 will be selected in advance by a user, based on which the server supplies the information.

From the user, the server receives a monthly payment of a fee for a basic contract (basic fee) and a fee for an optional contract (additional fee).

In accordance with the charge system, meal information may be supplied monthly.

In a case where information sufficient for providing optional service is not obtained from a user, that is, when the volume of information from the user is extremely small or when no information is obtained, such processing may be adopted as providing no optional information and collecting no optional fee therefor.

Reception of analysis results of the present embodiment enables the user to review what meals he/she has taken and to read a desirable plan for taking meals of the hereafter in terms of health and esthetics from the advice and refer to the same.

In addition, the user is allowed to record all the meal data with ease by bar code reading from a menu at eating-out and bar code reading of the contents of intake meals from a book at home, thereby obtaining highly precise analysis results.

The calorie calculation agent is allowed to manufacture and sell the portable terminal 20 as a user terminal to make a profit and also call on parties concerned in diner business for putting an advertisement on a meal information supply site and on an analysis result notification to each user and collect advertisement fees to make a profit. Moreover, the agent can make a profit by selling a book indicative of meal data of food materials of an individual diner to each house.

Although for the above-described procedure in the foregoing first embodiment, the meal information supply system management costs have been described with respect to a method of operating the system by collecting service charges from a user, the method is not limited thereto and other methods are applicable of operating the system by using an advertisement service charge of each party concerned in diner business, sales of the portable terminals 20 or the like with all the service charge of each user (or only a basic fee) set to be free.

The user's portable terminal of the present invention can be of various forms other than the form described in the above-described first embodiment. More specifically, the form of a cellular phone combined with a bar code reader, the form of a Palm terminal with a bar code reader mounted and the form of a hand-held PC can be used as well.

Further possible form is arrangement of a terminal for uploading meal data and downloading analysis results at diners and convenience stores. The terminal can be equipped with a function of inputting meal data and a function of displaying and printing downloaded analysis results.

In the meal information supply system of the present embodiment, the functions of the analysis processing unit 11, the account management unit 13 and the like of the meal information supply server 10 and other functions can be realized not only as hardware but also by loading a computer program having the respective functions into a memory of a computer processing device. The computer program is stored in a recording medium 90 such as a magnetic disk or a semiconductor memory. Then, loading the computer program from the recording medium into the computer processing device to control operation of the computer processing device realizes each of the above-described functions.

Although the present invention has been described in the foregoing with respect to the preferred modes of implementation and embodiments, the present invention is not necessarily limited to those described above and it can be implemented in various forms within a scope of its technical ideas.

As described in the foregoing, the meal information supply system and the meal information supply service method thereof of the present invention attain the following effects.

First, calorie calculation agent service (meal information supply service) of calculating meal information such as a calorie of a meal taken by a user can be executed. As a result, more and more users are enabled to manage their daily eating habits with ease to enhance consciousness of health and esthetics.

Secondly, advertisements of parties concerned in diner business can be put on a meal information supply site. This enables the parties concerned in diner business to have more opportunities of publicity because they are allowed to put their advertisements on the meal information supply site.

Thirdly, parties concerned in diner business who put the bar codes according to the present invention on menus can expect effects of gathering many customers because they are diners having the bar codes on menus. Moreover, the wide spread of the present invention will vitalize eating-out industries to promote more users for eating-out.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A meal information supply system, comprising:
a handheld user terminal which obtains meal data indicative of the contents of an individual meal taken by a user;
a meal information supply server which receives a notification of said meal data from said user terminal and analyzes the contents of a meal indicated by said meal data to notify said user of meal information of analysis results, wherein
said meal information supply server totalizes, manages and analyzes information about intake including information of a calorie and a food group of a meal taken by each said user and supplies meal information of analysis results to said user, wherein
said server supplies additional information about health based on the contents of meal data taken by said user, wherein at the supply of said additional service, an extra charge is collected from said user, wherein
said meal information includes indication of meals, nutritive elements and food groups taken for a fixed time period, as well as advice on eating habits optimum for each individual taking the individual's age, sex, physical features, daily customs, having disease or not and wishes into consideration, wherein
said handheld user terminal includes a connection interface that connects to an external terminal, and wherein
said external terminal transmits said meal data to said meal information supply server through a communication network.

2. The meal information supply system as set forth in claim 1, wherein said meal information supply server totalizes, manages and analyzes information about intake including information of a calorie and a food group of a meal taken by each said user based on said meal data notified with respect to each said user and notifies meal information of analysis results to said user, and
based on said intake information of each said user, generates data of advice on management of eating habits of the user in question to notify the user in question of said meal information with the generated data included.

3. The meal information supply system as set forth in claim 1, wherein said user terminal comprises a bar code reader which receives supply of said meal data of a meal taken by said user as bar code indication, wherein said bar code is read to obtain the meal data in question.

4. The meal information supply system as set forth in claim 3, further comprising a book having a list of bar codes indicative of meal data of individual meal and food material, with reference to which book a user obtains meal data of a meal taken by himself/herself.

5. The meal information supply system as set forth in claim 1, wherein said meal information supply server receives a notification of said meal data through a communication network and gives a notification of said meal information through the communication network.

6. The meal information supply system as set forth in claim 1, wherein said meal information supply server includes account management unit which manages accounts of a service charge of each said user.

7. A user terminal for meal management, comprising:
a memory which records meal data indicative of the contents of an individual meal taken by a user, a bar code reader which obtains said meal data indicated by a bar code, a meal information supply server of said meal data, which analyzes the contents of a meal taken by said user based on said meal data, and a notification unit which outputs said meal data obtained to notify said meal data to said meal information supply server, wherein said user terminal is handheld, wherein said handheld user terminal includes a connection interface that connects to an external terminal, and wherein said external terminal transmits said meal data to said meal information supply server through a communication network, wherein said server totalizes, manages and analyzes information about intake including information of a calorie and a food group of a meal taken by each said user based on said meal data notified with respect to each said user and supplies meal information of analysis results to said user, wherein said server supplies additional information about health based on the contents of meal data taken by said user, wherein at the supply of said additional service, an extra charge is collected from said user, wherein said meal information includes indication of meals, nutritive elements and food groups taken for a fixed time period, as well as advice on eating habits optimum for each individual taking the individual's age, sex, physical features, daily customs, having disease or not and wishes into consideration.

8. The user terminal for meal management as set forth in claim 7, further comprising a connection interface for the connection with said external terminal device to notify said meal information supply server of said meal data obtained through said terminal device.

9. The user terminal for meal management as set forth in claim 7, wherein said handheld terminal has a strap for the carriage of the terminal hanging on the neck.

10. A meal information supply service method, comprising the steps of:

receiving a notification of meal data from a handheld user terminal for obtaining said meal data indicative of the contents of an individual meal taken by a user, totalizing, managing and analyzing information about intake including information of a calorie and a food group of a meal taken by said user based on said meal data notified to said user and notifying meal information of analysis results to said user, and supplying a totalization result of said meal information determined based on the contents of a meal taken by said user and said advice on management of eating habits and additional service of supplying additional information about health, wherein at the supply of said additional service, an extra charge is collected from said user, wherein said meal information includes indication of meals, nutritive elements and food groups taken for a fixed time period, as well as advice on eating habits optimum for each individual taking the individual's age, sex, physical features, daily customs, having disease or not and wishes into consideration, wherein said handheld user terminal includes a connection interface that connects to an external terminal, and wherein said external terminal transmits said meal data to said meal information supply server through a communication network.

11. The meal information supply service method as set forth in claim 10, further comprising a step of, based on said intake information of each said user, generating data of advice on management of eating habits of the user in question to notify the user in question of said meal information with the generated data included.

12. A meal information supply service method, comprising the steps of:

receiving a notification of meal data from a handheld user terminal for obtaining said data indicative of the contents of an individual meal taken by a user, totalizing, managing and analyzing information about intake including information of a calorie and a food group of a meal taken by said user based on said meal data notified to said user and notifying meal information of analysis results to said user, and supplying a totalization result of said meal information determined based on the contents of a meal taken by said user and said advice of management of eating habits and additional service of supplying additional information about health, wherein at the supply of said additional service, an extra charge is collected from said user, wherein, said meal information includes indication of meals, nutritive elements and food groups taken for a fixed time period, as well as advice on eating habits optimum for each individual's age, sex, physical features, daily customs, having disease or not and wishes into consideration, wherein notifying a party concerned in diner business of specifications of a bar code indicative of said meal data of an individual meal in advance, said party concerned in diner business of indicating said meal data of a meal to be supplied to a user as a bar code to said user, said user obtaining said meal data of a meal supplied by said party concerned in diner business by the function of a bar code reader provided at a user terminal, and said user receiving a notification of meal data from said user terminal indicative of the contents of an individual meal taken by said user, wherein said user terminal includes a connection interface that connects to an external terminal, and wherein said external terminal transmits said meal data to said meal information supply server through a communication network.

13. The meal information supply service method as set forth in claim 12, further comprising a step of providing said user with a book having a list of bar codes indicative of meal data of individual meal and food material, with reference to which book a user obtains meal data of a meal taken by himself/herself.

14. The meal information supply service method as set forth in claim 12, further comprising the steps of:

setting up a web site for the supply of service to said user, and putting an advertisement of said party concerned in diner business on said web site to collect an advertisement fee.

15. A meal information management program readable by a computer, comprising the functions of:

receiving a notification of said meal data from a handheld user terminal for obtaining meal data indicative of the contents of an individual meal taken by a user, totalizing, managing and analyzing information about intake including information of a calorie and a food group of a meal taken by said user based on said meal data notified to said user and notifying meal information of analysis results to said user, and supplying a totalization result of said meal information determined based on the contents of a meal taken by said user and said advice of management of eating habits and additional service of supplying additional information about health, wherein at the supply of said additional service, an extra charge is collected from said user, wherein, said meal information includes indication of meals, nutritive elements and food groups taken for a fixed time period, as well as advice on eating habits optimum for each individual's age, sex, physical features, daily customs, having disease or not and wishes into consideration, wherein said handheld user terminal includes a connection interface that connects to an external terminal, and wherein said external terminal transmits said meal data to said meal information supply server through a communication network.

16. The meal information management program as set forth in claim 15, further comprising the functions of:

generating data of advice on management of eating habits of the user in question based on said intake information of each said user, and notifying the user in question of said meal information with the generated data included.

17. The meal information management program as set forth in claim 15, further comprising the functions of:

receiving a notification of said meal data through a communication network, and giving a notification of said meal information to said user through the communication network.

18. The meal information management program as set forth in claim 15, further comprising an account management function of managing accounts of a service charge of each said user.

19. The meal information management program as set forth in claim 15, wherein said user terminal has a function of reading said meal data indicated by a bar code, a function of recording and holding said meal data read in an internal memory and a function of outputting each said meal data held in said memory to notify said meal data to a meal information supply server which analyzes the contents of a meal taken by a user in question based on said meal data.

* * * * *